United States Patent
Clapham et al.

(10) Patent No.: US 9,951,726 B2
(45) Date of Patent: Apr. 24, 2018

(54) METHOD AND APPARATUS TO PREVENT ROTATION

(71) Applicant: G.W. Lisk Company, Inc., Clifton Springs, NY (US)

(72) Inventors: Shawn Clapham, Canandaigua, NY (US); Jeffery Tyler, Newark, NY (US)

(73) Assignee: G.W. Lisk Company, Inc., Clifton Springs, NY (US)

( * ) Notice: Subject to any disclaimer, the term of this patent is extended or adjusted under 35 U.S.C. 154(b) by 58 days.

(21) Appl. No.: 15/225,695

(22) Filed: Aug. 1, 2016

(65) Prior Publication Data
US 2018/0030935 A1    Feb. 1, 2018

(51) Int. Cl.
| F16K 1/22 | (2006.01) |
| F02M 26/65 | (2016.01) |
| F16K 31/54 | (2006.01) |
| F16K 31/16 | (2006.01) |
| F02M 26/59 | (2016.01) |
| F16K 1/226 | (2006.01) |

(52) U.S. Cl.
CPC ............ F02M 26/65 (2016.02); F02M 26/59 (2016.02); F16K 1/221 (2013.01); F16K 1/226 (2013.01); F16K 31/16 (2013.01); F16K 31/54 (2013.01)

(58) Field of Classification Search
CPC ........ F02M 26/65; F02M 26/59; F16K 31/16; F16K 1/226; F16K 1/221; F16K 31/54
USPC .................... 251/305–308, 214, 250, 900
See application file for complete search history.

(56) References Cited

U.S. PATENT DOCUMENTS

| 4,575,046 A | * | 3/1986 | Krause | ................... F16K 1/2263 |
| | | | | 137/15.25 |
| 5,257,772 A | * | 11/1993 | Habicht | .............. F16K 27/0218 |
| | | | | 251/305 |
| 5,482,252 A | * | 1/1996 | Kamezawa | ........... F16K 1/2265 |
| | | | | 251/305 |
| 5,564,461 A | | 10/1996 | Raymond, Jr. et al. | |

(Continued)

FOREIGN PATENT DOCUMENTS

| GB | 1131304 A | 10/1968 |
| WO | 2009149557 A1 | 12/2009 |
| WO | 2012038351 A1 | 3/2012 |

OTHER PUBLICATIONS

European Search Report for Application No. 17184300.6-1751, dated Dec. 14, 2017.

*Primary Examiner* — John Bastianelli
(74) *Attorney, Agent, or Firm* — Timothy W. Menasco, Esq.; Brian B. Shaw, Esq.; Harter Secrest & Emery LLP

(57) ABSTRACT

A valve assembly includes a butterfly valve rotatably moveable between a closed position and an open position, and a shaft extending from the butterfly valve and rotatable about a longitudinal axis to move the butterfly valve between the open position and the closed position. The valve assembly further includes an actuator having a body operable to maintain an end portion of the shaft, the actuator operable to cause the shaft to rotate about the longitudinal axis, a housing sized to retain a portion of the shaft, the housing operable to be in removeable contact with the body, a seal intermediate the body and the shaft, the seal having an outer sealing surface contacting the body and an inner sealing surface contacting the shaft, and an anti-rotation interface between the seal and the housing.

26 Claims, 6 Drawing Sheets

(56) References Cited

U.S. PATENT DOCUMENTS

Figure 1:
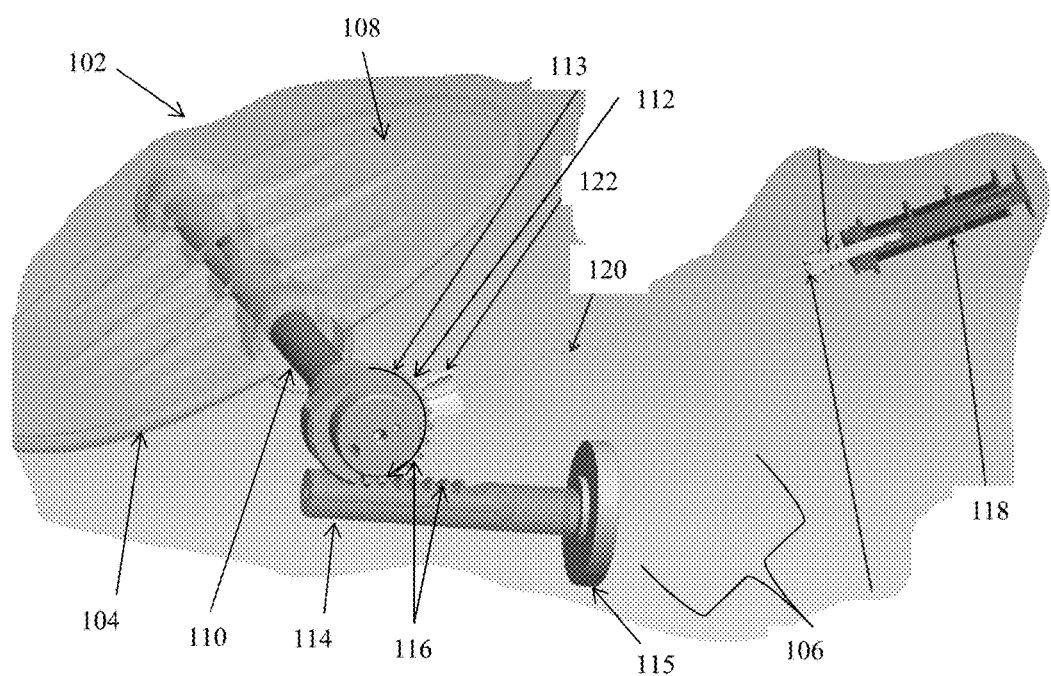

| | | | | |
|---|---|---|---|---|
| 6,036,172 | A | * | 3/2000 | Pajard ........................ F02D 9/10 |
| | | | | 251/250 |
| 6,390,447 | B1 | * | 5/2002 | Mosher ............... F16K 27/0218 |
| | | | | 251/151 |
| 6,601,821 | B2 | | 8/2003 | Tyler |
| 6,883,320 | B2 | | 4/2005 | Tyler |
| 8,413,684 | B2 | * | 4/2013 | Thomas ................ F16K 5/0642 |
| | | | | 137/602 |
| 2011/0031425 | A1 | | 2/2011 | Tyler |
| 2011/0155939 | A1 | * | 6/2011 | Casillas ................. F16K 1/222 |
| | | | | 251/305 |

* cited by examiner

702: (a) providing a butterfly valve rotatably moveable between a closed position and an open position, a shaft extending from the butterfly valve and rotatable about a longitudinal axis to move the butterfly valve between the open position and the closed position, an actuator having a body operable to maintain an end portion of the shaft, the actuator operable to cause the shaft to rotate about the longitudinal axis, a housing sized to retain a portion of the shaft, the housing operable to be in removeable contact with the body, a seal intermediate the body and the shaft, the seal having an outer sealing surface contacting the body and an inner sealing surface contacting the shaft, and an anti-rotation interface between the seal and the housing; and (b) rotating the shaft about the longitudinal axis to move the butterfly valve between the closed position and the open position, wherein the anti-rotation interface prevents rotation of the seal relative to the body

704: wherein the outer sealing surface includes an O-ring

706: wherein the actuator is a hydraulic actuator

708: wherein the shaft includes a pinion gear

710: wherein static friction between the seal and the housing is greater than static friction between the seal and the shaft

712: wherein the anti-rotation interface is an anti-rotation coupling

714: wherein the anti-rotation interface is an anti-rotation connection

716: wherein the anti-rotation interface is an anti-rotation interlock

718: wherein the seal includes a cylindrical body having a peripheral seating channel sized to receive an O-ring, and the anti-rotation interface is located between the O-ring and the housing

FIG. 7

METHOD AND APPARATUS TO PREVENT ROTATION

BACKGROUND OF THE INVENTION

Field of the Invention

The present disclosure relates to a method and apparatus for preventing rotation. The present disclosure relates more specifically to a method and apparatus for preventing unintended rotation.

Description of Related Art

Exhaust gas from an internal combustion engine can be used to alter the operating parameters of the engine. The flow of exhaust gas is controlled through valves within or exposed to the exhaust system of the engine. Exhaust gas emissions can be lowered though the use of exhaust gas recirculation (EGR) to recirculate a portion of the exhaust gas to the air intake steam. EGR valves provide for a reduction in the formation of nitrogen oxides ($NO_x$) during combustion by redirecting a portion of the exhaust gas to the air intake system of the engine.

As the EGR valve is exposed to exhaust flow for extended periods, wherein the velocity of the exhaust flow can vary substantially, the EGR valve must withstand significant stress. The need exists for an EGR valve that can accommodate the intended operating environment as well as manufacturing tolerances without experiencing excessive wear or deterioration that can lead to failure or a material reduction in performance characteristics.

BRIEF SUMMARY OF THE INVENTION

In view of the foregoing, it is an object of the present disclosure to provide a method and apparatus for preventing rotation.

A first exemplary embodiment of the present disclosure provides a valve assembly for preventing rotation. The valve assembly includes a butterfly valve rotatably moveable between a closed position and an open position, and a shaft extending from the butterfly valve and rotatable about a longitudinal axis to move the butterfly valve between the open position and the closed position. The valve assembly further includes an actuator having a body operable to maintain an end portion of the shaft, the actuator operable to cause the shaft to rotate about the longitudinal axis, a housing sized to retain a portion of the shaft, the housing operable to be in removeable contact with the body, a seal intermediate the body and the shaft, the seal having an outer sealing surface contacting the body and an inner sealing surface contacting the shaft, and an anti-rotation interface between the seal and the housing.

A second exemplary embodiment of the present disclosure provides a valve system includes a valve positioned in an engine exhaust passage and configured to rotate with a shaft to regulate a flow of engine exhaust, and a hydraulic actuator contained in a body and configured to move the valve via a pinion positioned on the shaft. The valve system includes a seal positioned around the shaft sealing the engine exhaust passage from the body to retain oil in the hydraulic actuator, and an anti-rotation interface between at least a portion of the seal and the body to substantially preclude rotation of the seal relative to the body upon rotation of the shaft.

A third exemplary embodiment of the present disclosure provides a method for preventing rotation. The method includes providing a butterfly valve rotatably moveable between a closed position and an open position, a shaft extending from the butterfly valve and rotatable about a longitudinal axis to move the butterfly valve between the open position and the closed position, an actuator having a body operable to maintain an end portion of the shaft, the actuator operable to cause the shaft to rotate about the longitudinal axis, a housing sized to retain a portion of the shaft, the housing operable to be in removeable contact with the body, a seal intermediate the housing and the shaft, the seal having an outer sealing surface contacting the body and an inner sealing surface contacting the shaft, and an anti-rotation interface between the seal and the housing. The method further includes rotating the shaft about the longitudinal axis to move the butterfly valve between the closed position and the open position, wherein the anti-rotation interface prevents rotation of the seal relative to the body.

A fourth exemplary embodiment of the present disclosure provides a valve assembly for preventing rotation. The valve assembly includes a butterfly valve rotatably moveable between a closed position and an open position, the butterfly valve maintained within a casing, a shaft extending from the butterfly valve through the casing and rotatable about a longitudinal axis to move the butterfly valve between the open position and the closed position, and an actuator having a body operable to maintain an end portion of the shaft, the actuator operable to cause the shaft to rotate about the longitudinal axis. The valve assembly further includes a housing sized to retain a portion of the shaft, the housing operable to be in removeable contact with the casing, a seal intermediate the body and the shaft, the seal having an outer sealing surface contacting the body and an inner sealing surface contacting the shaft, and an anti-rotation interface between the seal and the housing.

The following will describe embodiments of the present disclosure, but it should be appreciated that the present disclosure is not limited to the described embodiments and various modifications of the invention are possible without departing from the basic principle. The scope of the present disclosure is therefore to be determined solely by the appended claims.

BRIEF DESCRIPTION OF THE SEVERAL VIEWS OF THE DRAWING(S)

FIG. 1 presents an exemplary valve suitable for use in practicing exemplary embodiments of the present disclosure.

Figure 2:
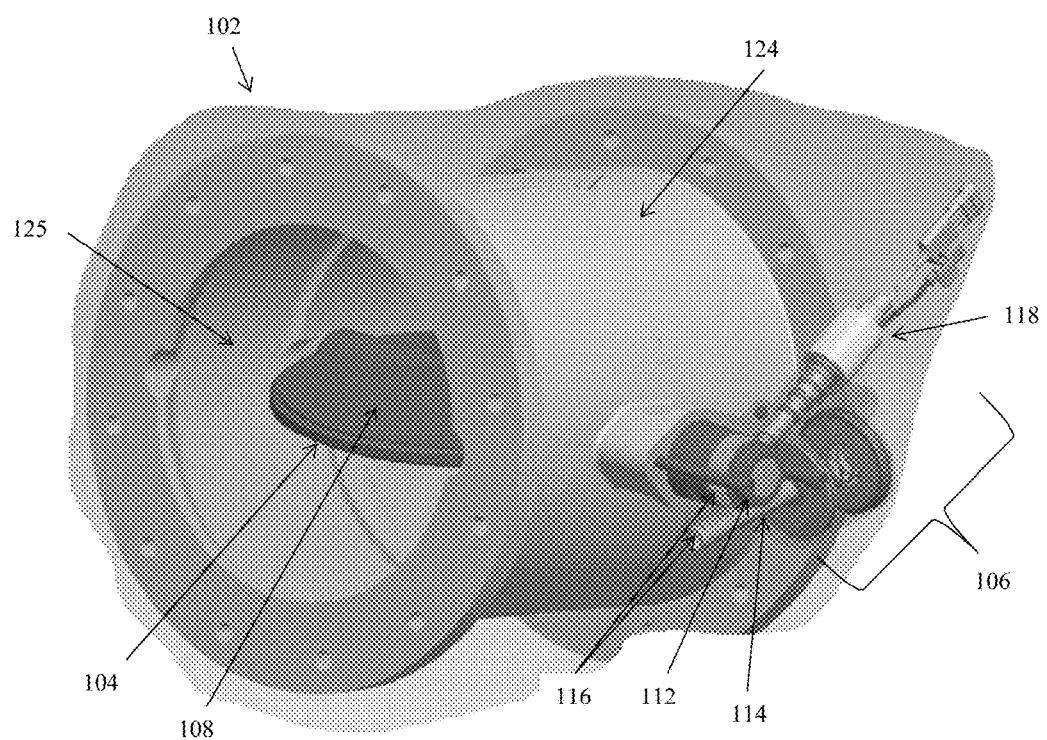

FIG. 2 presents another exemplary valve suitable for use in practicing exemplary embodiments of the present disclosure.

Figure 3:
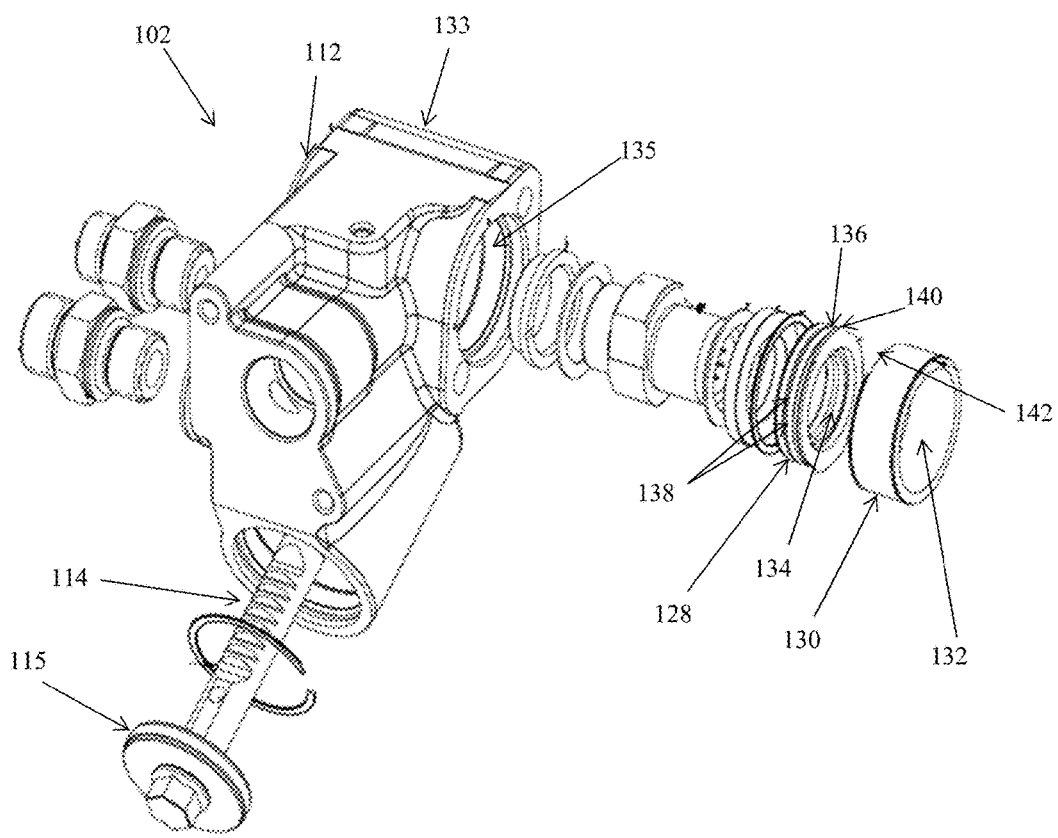

FIG. 3 presents an exploded view of an exemplary valve suitable for use in practicing exemplary embodiments of the present disclosure.

Figure 4:
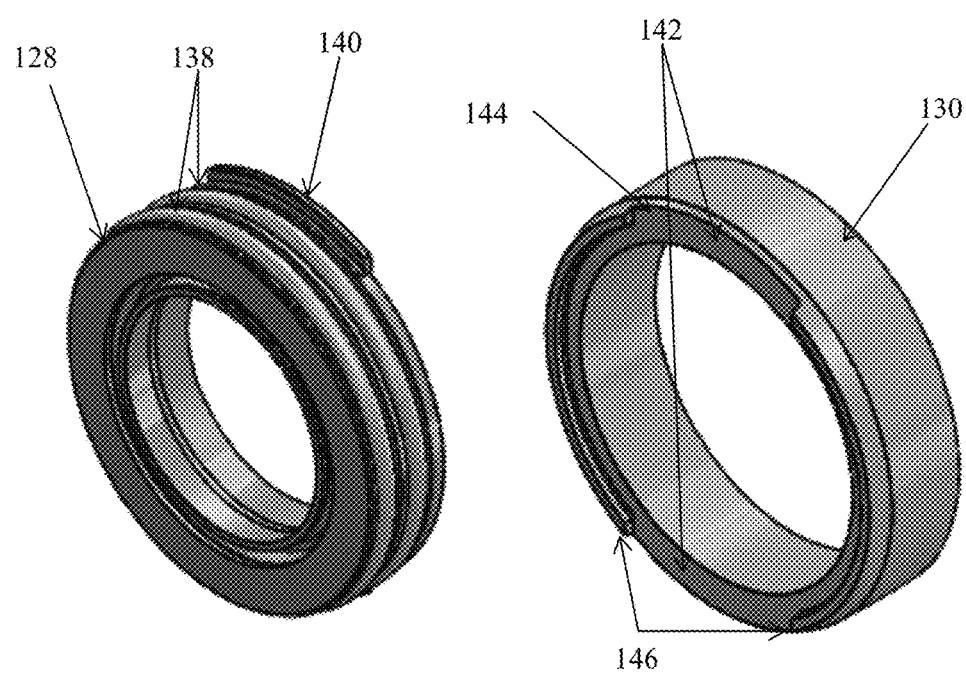

FIG. 4 presents a close-up view of an exemplary housing and seal suitable for use in practicing exemplary embodiments of the present disclosure.

Figure 5:
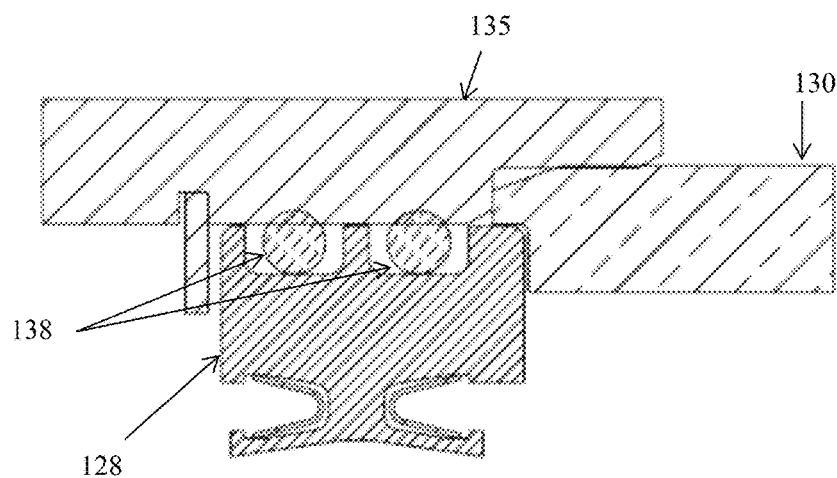

FIG. 5 presents a cross sectional view of a portion of an exemplary housing and seal suitable for use in practicing exemplary embodiments of the present disclosure.

Figure 6:
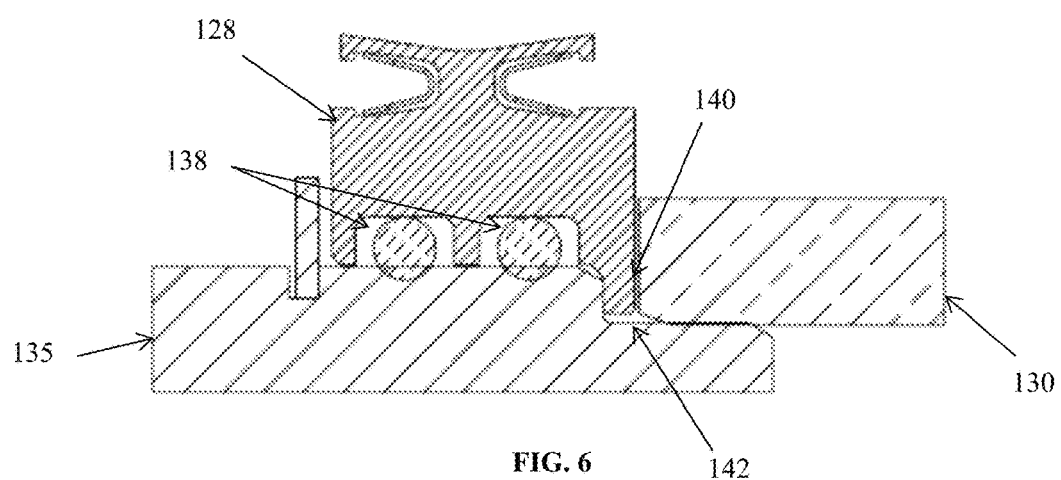

FIG. 6 presents a cross sectional view of another portion of an exemplary housing and seal suitable for use in practicing exemplary embodiments of the present disclosure.

FIG. 7 presents a logic flow diagram in accordance with a method and apparatus for performing exemplary embodiments of the presents disclosure.

DETAILED DESCRIPTION OF THE INVENTION

Embodiments of the present disclosure provide an exhaust gas recirculation (EGR) valve assembly with a butterfly valve. The butterfly valve is operable to move from a closed position obstructing a flow (such as a flow of exhaust) through a passage to a plurality of open positions to allow a flow through the passage. The exemplary valve assembly includes a seal and a housing circumscribing a shaft coupled to the butterfly valve. In practice, when the butterfly valve and shaft rotates, the seal can rotate in the body prematurely wearing the seal, which results in leakage through the seal. Exemplary embodiments of the seal and housing are operably coupled together to prevent rotation of the seal relative to the body.

Reference is now made to FIG. 1, which depicts an exemplary valve assembly suitable for practicing exemplary embodiments of the present disclosure. Shown in FIG. 1 is valve assembly 102. Embodiments of valve assembly 102 can be operably used in an engine exhaust system, such as an exhaust gas recirculation valve. Embodiments of valve assembly 102 are operably positioned within an engine (e.g., internal combustion engine, diesel engine, locomotive engine, etc.) to receive a flow of exhaust gas. Valve assembly 102 includes butterfly valve 104 operable to move in response to movement of hydraulic actuator 106. Butterfly valve 104 includes a circular plate 108 with a shaft 110 extending through the diameter of circular plate 108. It should be appreciated that while butterfly valve 104 as depicted in FIGS. 1 and 2 only include one circular plate 108, embodiments of butterfly valve 108 include one, two or more circulate plates 108. Butterfly valve 104 is operable to rotate about the longitudinal axis of shaft 110 in response to rotation of shaft 110. Shaft 110 extends from circular plate 108 and is operably coupled to pinion 112.

Pinion 112 is operable to rotate about a central axis as indicated by arrow 113, which corresponds to the longitudinal axis of shaft 110 in response to and corresponding to movement of rack 114. Rack 114 operably moves through its longitudinal axis in response to hydraulic pressure in hydraulic actuator 106. Rack 114 is coupled to piston 115. Piston 115 is operable to move through the longitudinal axis of rack 114 in response to changes in hydraulic pressure from hydraulic actuator 106. Hydraulic actuator 106 allows a flow of fluid, such as oil to create a pressure on piston 115 urging piston 115 and rack 114 to move through the longitudinal axis of rack 114. Pinion 112 and rack 114 each include a plurality of notches 116 that operably interlock together as shown in FIG. 1. In practice, when rack 112 with notches 116 moves in response to hydraulic pressure through its longitudinal axis, notches 114 on pinion 112 cause pinion 112 and shaft 110 to rotate about its longitudinal axis.

Hydraulic actuator 106 includes a sensor 118 operable to sense the rotational position of pinion 112 and thus the rotation position of butterfly valve 104. An exemplary sensor 118 includes a linear variable displacement transducer. It should be appreciated that exemplary embodiments of sensor 118 include any sensor including a physical motion sensor that can operably sense or determine the rotational position and movement of pinion 112 and thus the rotational position and movement of butterfly valve 104. Sensor 118 includes a rod 120 coupled to a cam follower 122. Cam follower 122 is operably in surface contact with the surface of pinion 112. Cam follower 122 with rod 120 together are operable to move through the longitudinal axis of rod 120 such that cam follower 122 and rod 120 can extend or compress in response to rotation of pinion 112 to track changes in the position of the surface of pinion 112 relative to sensor 118.

Referring to FIG. 2 is the exemplary valve assembly 102 within casing 124. Shown in FIG. 2 is valve assembly 102 with butterfly valve 104 and hydraulic actuator 106. Butterfly valve 104 is operably coupled to shaft 110 (not visible in FIG. 2). Shaft 110 is positioned through the diameter of circular plate 108 of butterfly valve 104. Shaft 110 extends from circular plate 108 and is operably coupled to pinion 112.

Pinion 112 with notches 114 is in operable connection with notches 114 of rack 116 such that movement of rack 116 through its longitudinal axis causes rotation of pinion 112. Rotation of pinion 112 operably causes rotation of shaft 110 about its longitudinal axis. The outside surface of pinion 112 is in contact with a portion of sensor 118. Sensor 118 is operable to sense the rotational position of pinion 112 and thus the rotational position of shaft 110 and butterfly valve 104. Shaft 110 is enclosed within casing 124 and is encompassed by a seal 128 and a housing 130.

Butterfly valve 104 is operably located within casing 124 such that is can substantially obstruct a flow through passage 125 in one rotational position (closed position) and also incrementally allow a flow through passage 125 in a plurality of other rotational positions (open positions). As shown in FIG. 2, butterfly valve 104 is in a position to allow a flow through passage 125. It should be appreciated that embodiments of butterfly valve 104 are operable to be located at a plurality of different positions to allow or obstruct a flow through passage 125.

Reference is now made to FIG. 3, which depicts an exploded view of a portion of an exemplary valve assembly suitable for practicing exemplary embodiments of the present disclosure. Shown in FIG. 3 is a portion of valve assembly 102, which includes pinion 112, piston 115, rack 112, and the seal 128 and housing 130. Shaft 110 is not depicted in FIG. 3, but is located within shaft opening 132. Thus, shaft 110 is circumscribed by seal 128 and housing 130. Also shown in FIG. 3 is body 133. Body 133 operably maintains hydraulic actuator 106 including rack 114 and pinion 112. Embodiments of body 133 are operably to provide a housing that allows hydraulic actuator 106 with rack 114 and pinion 112 to cause shaft 110 and butterfly valve 108 to rotate.

Seal 128 as depicted includes an inner sealing surface 134, which comes into contact with the surface of shaft 110. Seal 128 also includes an outer sealing surface 136. Outer sealing surface 136 includes two O-rings 138 that circumscribe the outer sealing surface 136 and thus circumscribe shaft 110. It should be appreciated that while FIG. 3 only depicts seal 128 with two O-rings 138, embodiments include one or more O-rings 138. Housing 130 is sized to circumscribe the outer sealing surface 136 such that the inner surface 140 of housing 130 comes into contact with outer sealing surface 136 thereby creating an interface with O-rings 138. Embodiments of O-rings 138 include rubber O-rings or any other type of O-ring made of a flexible yet resilient material that can operably create a sealed interface with body 133 and outer sealing surface 136. Embodiments of seal 128 with o-rings 138 operably maintain a seal with body 133 thereby preventing leakage of fluid from within body 133 during rotation or operation of shaft 110 and pinion 112.

Seal 128 includes at least one flange 140, which extends radially outward from the outer sealing surface 136 of seal 128. Embodiments of seal 128 include one, two or more flanges 140. Housing 130 includes at least one notch 142 located along a side wall 144 of housing 130. The at least one notch 142 is sized and positioned on housing to correspond to flange 140 of seal 128. Embodiments of housing 130 can include one, two or more notches 142 that correspond to the number, size, and location of flanges 140 on seal 128. Embodiments of flange 140 of seal 128 and notch 142 of housing 130 substantially prevent rotation of seal 128 relative to housing 130. Housing 130 is operable to be removeably coupled to body 133 at interface 135 such that housing 130 cannot rotate relative to body 133. Housing 130 is operably to maintain a friction fit with body 133 such that the friction between housing 130 and body 133 is greater than the friction between housing 130 with seal 128 and shaft 110. Thus, housing 130 and seal 128 do not rotate due to frictional forces from shaft 110 when shaft 110 is rotated about its longitudinal axis. It should be appreciated that embodiments of flange 140 and notch 142 include interlocking teeth or any other mechanisms that allows seal 128 to be connected to housing 130 in a manner that substantially prevents rotation of seal 128 relative to housing 130 and body 133. In other words, seal 128 and housing 130 remain stationary even when pinion 112 and shaft 110 rotate. It should also be appreciated that while embodiments have been described in terms of seal 128 with flange 140 interfacing with housing 130, other exemplary embodiments include seal 128 with flange 140 interfacing with other elements of valve assembly 102 (e.g., body 133) provided that seal 128 is prevented from rotating relative to body 133 while shaft 110 rotates.

In another exemplary embodiment, housing 130 is operable to be removeably coupled to casing 124 such that housing 130 maintains a friction fit with casing 124. In this embodiment, the friction fit between housing 130 and casing 124 is greater than the friction between housing 130 with seal 128 and shaft 110. Therefore, housing 130 and seal 128 do not rotate due to frictional forces from shaft 110 when shaft 110 is rotated about is longitudinal axis.

Referring to FIG. 4, shown is a close-up view of seal 128 and housing 130. Seal 128 with O-rings 138 and flange 140. Flange 140 is positioned and sized to interact with notch 142 located on side wall 144 of housing 130. As can be seen in FIG. 4, housing 130 also includes a lip 146, which extends over the outer sealing surface 136 of seal 128 such that a portion of the outer sealing surface 136 (adjacent to flange 140) is covered by housing 130. The combination of lip 146 with flange 140 and notch 142 operably prevent rotation of seal 128 relative to housing 130.

Referring to FIG. 5, shown is a cross sectional view of seal 128 and housing 130. Also shown in FIG. 5 are O-rings 138. In FIG. 5 seal 128 is in contact 130 at a portion of seal 128 that does not have a flange 140. Referring now to FIG. 6, shown is a cross-sectional view of seal 128 with O-rings 138, and housing 130. As illustrated in FIG. 6, shown is the portion of seal 128 and housing 130 wherein flange 140 is within notch 142.

Referring to FIG. 7, presented is an exemplary logic flow diagram in accordance with a method, apparatus, and valve assembly for performing exemplary embodiments of this disclosure. Block 702 presents (a) providing a butterfly valve rotatably moveable between a closed position and an open position, a shaft extending from the butterfly valve and rotatable about a longitudinal axis to move the butterfly valve between the open position and the closed position, an actuator having a body operable to maintain an end portion of the shaft, the actuator operable to cause the shaft to rotate about the longitudinal axis, a housing sized to retain a portion of the shaft, the housing operable to be in removeable contact with the body, a seal intermediate the body and the shaft, the seal having an outer sealing surface contacting the body and an inner sealing surface contacting the shaft, and an anti-rotation interface between the seal and the housing; and (b) rotating the shaft about the longitudinal axis to move the butterfly valve between the closed position and the open position, wherein the anti-rotation interface prevents rotation of the seal relative to the body. Then block 704 specifies wherein the outer sealing surface includes an O-ring.

Some of the non-limiting implementations detailed above are also summarized at FIG. 7 following block 704. Block 706 relates wherein the actuator is a hydraulic actuator. Block 708 then states wherein the shaft includes a pinion gear. Then block 710 specifies wherein static friction between the seal and the housing is greater than static friction between the seal and the shaft. Block 712 indicates wherein the anti-rotation interface is an anti-rotation coupling. Then block 714 wherein the anti-rotation interface is an anti-rotation connection. Block 716 wherein the anti-rotation interface is an anti-rotation interlock. Finally, block 718 indicates wherein the seal includes a cylindrical body having a peripheral seating channel sized to receive an O-ring, and the anti-rotation interface is located between the O-ring and the housing.

The logic diagram of FIG. 7 may be considered to illustrate the operation of a method or the result of execution of an exemplary apparatus or valve assembly. The logic diagram of FIG. 7 may also be considered a specific manner in which components of a device are configured to cause that device to operate, whether such a device is a valve assembly, EGR valve, rotating shaft of a valve assembly, or one or more components thereof.

The following will describe embodiments of the present disclosure, but it should be appreciated that the present disclosure is not limited to the described embodiments and various modifications of the invention are possible without departing from the basic principle. The scope of the present disclosure is therefore to be determined solely by the appended claims.

The invention claimed is:

1. A method for preventing rotation, the method comprising:
   (a) providing a butterfly valve rotatably moveable between a closed position and an open position, a shaft extending from the butterfly valve and rotatable about a longitudinal axis to move the butterfly valve between the open position and the closed position, an actuator having a body operable to maintain an end portion of the shaft, the actuator operable to cause the shaft to rotate about the longitudinal axis, a housing sized to retain a portion of the shaft, the housing operable to be in removeable contact with the body, a seal intermediate the body and the shaft, the seal having an outer sealing surface contacting the body and an inner sealing surface contacting the shaft, and an anti-rotation interface between the seal and the housing; and
   (b) rotating the shaft about the longitudinal axis to move the butterfly valve between the closed position and the open position, wherein the anti-rotation interface prevents rotation of the seal relative to the body.

2. The method of claim 1, wherein the outer sealing surface includes an O-ring.

3. The method of claim 1, wherein the actuator is a hydraulic actuator.

4. The method of claim 1, wherein the shaft includes a pinion gear.

5. The method of claim 1, wherein static friction between the body and the housing is greater than static friction between the seal and the shaft.

6. The method of claim 1, wherein the anti-rotation interface is an anti-rotation coupling.

7. The method of claim 1, wherein the anti-rotation interface is an anti-rotation connection.

8. The method of claim 1, wherein the anti-rotation interface is an anti-rotation interlock.

9. The method of claim 1, wherein the seal includes a cylindrical body having a peripheral seating channel sized to receive an O-ring, and the anti-rotation interface is located between the O-ring and the housing.

10. A valve assembly for preventing rotation, the valve assembly comprising:
   (a) a butterfly valve rotatably moveable between a closed position and an open position;
   (b) a shaft extending from the butterfly valve and rotatable about a longitudinal axis to move the butterfly valve between the open position and the closed position;
   (c) an actuator having a body operable to maintain an end portion of the shaft, the actuator operable to cause the shaft to rotate about the longitudinal axis;
   (d) a housing sized to retain a portion of the shaft, the housing operable to be in removeable contact with the body;
   (e) a seal intermediate the body and the shaft, the seal having an outer sealing surface contacting the body and an inner sealing surface contacting the shaft; and
   (f) an anti-rotation interface between the seal and the housing, wherein the anti-rotation interface is operable to prevent rotation of the seal relative to the body.

11. The valve assembly of claim 10, wherein the outer sealing surface includes an O-ring.

12. The valve assembly of claim 10, wherein the actuator is a hydraulic actuator.

13. The valve assembly of claim 10, wherein the shaft includes a pinion gear.

14. The valve assembly of claim 10, wherein the anti-rotation interface substantially precludes rotation of the seal relative to the housing.

15. The valve assembly of claim 10, wherein static friction between the body and the housing is greater than static friction between the seal and the shaft.

16. The valve assembly of claim 10, wherein the anti-rotation interface is an anti-rotation coupling.

17. The valve assembly of claim 10, wherein the anti-rotation interface is an anti-rotation connection.

18. The valve assembly of claim 10, wherein the anti-rotation interface is an anti-rotation interlock.

19. The valve assembly of claim 10, further comprising a control valve in the body.

20. The valve assembly of claim 10, wherein the seal includes a cylindrical body having a peripheral seating channel sized to receive an O-ring, and the anti-rotation interface is located between the O-ring and the housing.

21. A valve assembly for preventing rotation, the valve assembly comprising:
   (a) a butterfly valve rotatably moveable between a closed position and an open position, the butterfly valve maintained within a casing;
   (b) a shaft extending from the butterfly valve through the casing and rotatable about a longitudinal axis to move the butterfly valve between the open position and the closed position;
   (c) an actuator having a body operable to maintain an end portion of the shaft, the actuator operable to cause the shaft to rotate about the longitudinal axis;
   (d) a housing sized to retain a portion of the shaft, the housing operable to be in removeable contact with the casing;
   (e) a seal intermediate the body and the shaft, the seal having an outer sealing surface contacting the body and an inner sealing surface contacting the shaft; and
   (f) an anti-rotation interface between the seal and the housing, wherein the anti-rotation interface is operable to prevent rotation of the seal relative to the body.

22. The valve assembly of claim 21, wherein static friction between the casing and the housing is greater than static friction between the seal and the shaft.

23. The valve assembly of claim 21, wherein the anti-rotation interface substantially precludes rotation of the seal relative to the housing.

24. The valve assembly of claim 22, wherein the static friction between the casing and the housing substantially precludes rotation of the housing and the seal relative to the casing.

25. The valve assembly of claim 21, wherein the outer sealing surface includes an O-ring.

26. The valve assembly of claim 21, wherein the anti-rotation interface is an anti-rotation coupling.

* * * * *